United States Patent [19]
Trinh et al.

[11] Patent Number: 4,755,354
[45] **Date of Patent: * Jul. 5, 1988**

[54] BROMIDE ACTIVATED HYPOCHLORITE CLEANING OF SOILED TOILET BOWLS

[75] Inventors: Toan Trinh, Maineville; Louis F. Wong, Mason, both of Ohio

[73] Assignee: The Procter & Gamble Company, Cincinnati, Ohio

[ * ] Notice: The portion of the term of this patent subsequent to Dec. 17, 2002 has been disclaimed.

[21] Appl. No.: 633,161

[22] Filed: Jul. 20, 1984

[51] Int. Cl.$^4$ .......................... E03D 9/03; C23G 1/02; A01N 25/08

[52] U.S. Cl. .......................................... 422/37; 4/227; 4/228; 134/2; 134/3

[58] Field of Search ...................... 422/37; 4/222, 227, 4/228; 134/2, 3

[56] References Cited

U.S. PATENT DOCUMENTS

| | | | |
|---|---|---|---|
| 2,807,807 | 10/1957 | Harper . | |
| 3,504,384 | 4/1970 | Radley et al. . | |
| 3,519,569 | 7/1970 | Diaz . | |
| 3,575,865 | 4/1971 | Burke et al. . | |
| 3,700,401 | 10/1972 | Spangler et al. . | |
| 3,705,103 | 12/1972 | Cohen | 134/2 X |
| 3,781,926 | 1/1974 | Levey | 4/228 |
| 3,833,419 | 9/1974 | Weiss et al. | 134/2 X |
| 4,116,849 | 9/1978 | Leikhim | 134/2 X |
| 4,171,546 | 10/1979 | Dirksing | 4/227 X |
| 4,174,289 | 11/1979 | Sorgenfrei et al. | 134/2 X |
| 4,208,747 | 6/1980 | Dirksing | 4/228 |
| 4,216,027 | 8/1980 | Wages | 4/228 X |
| 4,248,827 | 2/1981 | Kitko | 4/227 |
| 4,281,421 | 8/1981 | Nyquist et al. | 4/228 |
| 4,307,474 | 12/1981 | Choy | 4/228 |
| 4,308,625 | 1/1982 | Kitko | 422/37 X |
| 4,353,866 | 10/1982 | Wong | 422/37 |
| 4,435,857 | 3/1984 | Meloy | 4/228 |
| 4,438,534 | 3/1984 | Keyes et al. | 4/228 X |
| 4,459,710 | 7/1984 | Keyes et al. | 4/228 |
| 4,480,341 | 11/1984 | Richards | 4/228 |
| 4,480,342 | 11/1984 | Jones | 4/228 |
| 4,558,471 | 12/1985 | Brown et al. | 4/228 |

FOREIGN PATENT DOCUMENTS

| | | | |
|---|---|---|---|
| 0024039 | 2/1981 | European Pat. Off. | 4/228 |
| 2920635 | 11/1980 | Fed. Rep. of Germany | 4/228 |

*Primary Examiner*—Barry S. Richman
*Assistant Examiner*—Timothy M. McMahon
*Attorney, Agent, or Firm*—Leonard Williamson; Richard C. Witte

[57] ABSTRACT

A method of automatic brushless removal of existing soil and long term maintenance cleaning of flush toilet bowls with bromide activated hypochlorite salts. A solution which yields hypochlorite ions in a concentration of 30 to 100 ppm, and bromide ions in a concentration of 0.1 to 20 ppm is dispensed into the toilet bowl with each flush.

6 Claims, No Drawings

BROMIDE ACTIVATED HYPOCHLORITE CLEANING OF SOILED TOILET BOWLS

TECHNICAL FIELD

The present invention relates to the automatic cleaning and sanitizing of flush toilets. A bromide salt and a hypochlorite sanitizing agent are separately but simultaneously dispensed to the toilet bowl with each flush. Bromide ion catalysis enhances the hypochlorite activity in the toilet bowl within a short time after flushing, thereby providing increased cleaning activity of the hypochlorite.

BACKGROUND ART

This invention relates to methods, compositions and articles for automatically cleaning and sanitizing toilets wherein an activator composition and hypochlorite are separately dispensed into the toilet bowl during flushing.

Commercially available automatic toilet bowl cleaning products require initial manual cleaning prior to installation of those products. They then provide maintenance cleaning. The prior art automatic toilet bowl cleansers (ATBC) do not provide or speak to automatic initial cleaning.

Automatically dispensed toilet bowl cleaning and/or sanitizing products, which contain bromide to provide activated hypochlorite to bleach dyes are known.

U.S. Pat. No. 4,248,827, Kitko, issued Feb. 3, 1981, discloses certain dyes which are bleached to a colorless state in less than 10 minutes in the toilet bowl by hypochlorite which is catalyzed by bromide ion. However, this patent does not teach that the higher levels of the available chlorine (20 ppm plus) with the bromide are needed for nonmanual initial cleaning of the toilet bowls. In fact, the preferred levels (2–10 ppm of available chlorine) taught by Kitko are much too low for nonmanual initial cleaning.

U.S. Pat. No. 4,353,866, Wong, issued Oct. 12, 1982, discloses a method of bleaching of certain triarylmethane dyes in aqueous systems with low concentration of hypochlorite ion, activated by the presence of bromide ion and ammonium ions. The method is particularly useful in providing a disappearing color signal in the automatic cleaning and sanitizing of toilet bowls with low concentrations of hypochlorite.

An object of the invention is to provide a method for automatic cleaning and sanitization of toilets wherein organic soils are removed without initial manual cleaning of the toilet bowl, and to provide articles and compositions adapted for use in said method.

SUMMARY OF THE INVENTION

The present invention broadly relates to a method comprising the step of forming in a toilet bowl a solution comprising from about 20 ppm to about 100 ppm of available chlorine from hypochlorite ion, preferably from 30 to 50 ppm of available chlorine; from about 0.1 to about 20 ppm bromide ion, preferably, from 0.3 to 3 ppm bromide ion and most preferably from 0.5 to 2 ppm bromide ion for at least 15 to 70 flushes. Thereafter, maintaining from about 3 ppm to up to below about 20 ppm available chlorine for at least 100 flushes. The available chlorine to bromide ion ratio in said solution is from about 1:1 to about 1000:1, preferably 10:1 to 100:1. The pH of the solution is from about 6 to about 9.5.

DISCLOSURE OF THE INVENTION

Again the present invention relates to a method of treating a flush toilet with a hypochlorite sanitizing agent each time the toilet is flushed, and providing automatic cleaning of existing soils in the bowl. The said method comprises the step of dispensing from separate dispensing means, into the flush water: (A) an aqueous solution of a compound which produces hypochlorite ion in bowl water; and (B) a solution comprising a compound which produces bromide ion in the bowl water. A final solution is thereby formed in the toilet bowl at the end of each flush cycle which comprises from about 20 ppm to about 100 ppm available chlorine from said hypochlorite ion and from about 0.1 to about 20 ppm bromide ion, and an available chlorine to bromide ion in a ratio of from about 1:1 to about 1000:1. (All compositions, concentrations and proportions herein are stated on a "by weight" based unless indicated otherwise.)

The 20 to 100 ppm of available chlorine and 0.1 to 20 ppm of bromide ion are dispensed for about 15 to 70 flushes under normal use to provide improved automatic initial nonmanual cleaning of existing organic soils in the bowl. Afterwards the level of chlorine can be reduced to about 3 to 20 ppm for maintenance cleaning of the bowl for at least 100 flushes. A preferred dispenser is designed to dispense 200 to 500 flushes for extended maintenance cleaning. In other words, less available chlorine is required for maintenance cleaning than the initial cleaning of a soiled toilet bowl. Normal use is defined as from about 5 to 15 flushes per day.

While not being bound to any theory, it is believed that the bromide ions function as "activators" which accelerate the bleaching and cleaning action of the hypochlorite on the organic soils.

The Sanitizing Agent

The sanitizing agent of the present invention can be any compound which provides the hypochlorite ion ($OCl^-$) in aqueous solution. Such compounds include alkali metal and alkaline earth metal hypochlorites, hypochlorite addition products, chloramines, chlorimines, chloramides, and chlorimides. Specific examples of compounds of this type include sodium hypochlorite, potassium hypochlorite, lithium hypochlorite, calcium hypochlorite, calcium hypochlorite dihydrate, monobasic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, 1,3-dichloro-5,5-dimethylhydantoin, N-chlorosulfamide, Chlormaine T, Dichloramine T, Chloramine B, Dichloramine B, and Di-Halo (bromochlorodimethyl hydantoin). HTH is a commercially available source of calcium hypochlorite [66–70% $Ca(OCl)_2$]. Some suitable sanitizing agent compositions for use in the practice of the present invention are described in commonly assigned U.S. Pat. No. 4,281,421, Nyquist et al., issued Aug. 4, 1981, and commonly assigned U.S. Pat. No. 4,200,606, Kitko, issued Apr. 29, 1980, both of said patents being incorporated herein by reference. The preferred compositions are compacted cakes comprising lithium hypochlorite and calcium hypochlorite. The composition in the Nyquist et al. patent additionally comprises nondissolving sodium metasilicate material.

By virtue of the strong oxidizing power of the hypochlorite ion, it is highly effective in bleaching stains, breaking down and removing soils and killing microorganisms, thereby providing effective sanitizing action in the toilet bowl.

The amount of hypochlorite-providing sanitizing compound dispensed to the toilet in the process of the invention can vary, but for this invention should be sufficient to provide from about 20 to about 100 ppm available chlorine and preferably from about 20 to about 50 ppm available chlorine in the bowl water at the end of the flush for 15 to 70 flushes. Available chlorine over 30 ppm provides most excellent nonmanual initial cleaning when used in combination with 1 ppm bromide ion. The initial high level of chlorine can be provided by a booster tablet installed in a separate compartment of a "bottom feed" automatic dosing dispenser disclosed in commonly assigned Brown and Strickland U.S. patent application Ser. No. 632,779, filed July 20, 1984, now U.S. Pat. No. 4,558,471, issued Dec. 17, 1985, incorporated herein by reference. FIG. 1 from said patent is attached as an illustration of the invention herein.

The sanitizing agent can be formulated as an aqueous liquid if it is to be dispensed from a dispensing means designed to receive liquids. The sanitizing agent can also be formulated into the form of a solid cake for use in dispensing means which are designed to receive a cake of solid material (see description of dispensing means below). The level of available chlorine in the bowl water can be measured by well-known methods such as the DPD Ferrous Titrametric Method or the Stabilized Neutral Orthotolidine Method, described, respectively, at pages 129 and 126 of Standard Methods for the Examination of Water and Wastewater, 13th Ed., published by American Public Health Association.

A preferred sanitizing agent composition is a solid cake of:

| | |
|---|---|
| HTH | 90% |
| LiOCl (Form II) | 10% |

which is dry mixed and tableted.

Activator Ions

The activator system for carrying out the method of the present invention comprises bromide ions. Since the preferred aspect of the present invention relates to its use in the automatic cleaning and sanitizing of flush toilets, the invention will be described herein primarily in the context of that utility.

These ions can be supplied by any water-soluble source of the ions. For example, bromide ion can be provided by water-soluble inorganic salts such as the alkali metal bromides (e.g., sodium and potassium bromides), alkaline earth metal bromides (e.g., calcium and magnesium bromides), zinc bromide and ferric bromide. The term "water-soluble" as used herein means that the material in question has a solubility in ambient temperature water which is sufficient to produce the concentrations specified for that material in the herein-described invention. In the context of toilet bowl treatment, the alkali metal bromides are preferred. The preferred source of bromide ions is sodium bromide.

Organic salts such as cetylpyridinium bromide can also be used.

Ammonium ions at high levels are undesirable and should be avoided.

The amount of bromide ion which should be present in solution to activate the hypochlorite in the method of the invention can vary. Generally there should be at least about 0.1 ppm up to 20 ppm of the bromide ion. Preferably there should be from about 0.3 to about 3 ppm bromide ion, and most preferably from about 0.5 to about 2 ppm of the ion.

The activator can be formulated as an aqueous liquid if it is to be dispensed from a dispensing means designed to receive liquids. The activator is preferably formulated into the form of a solid cake for use in dispensing means which are designed to receive a cake of solid material (see description of dispensing means below). The solid cake can contain in addition to the bromide ion source, other ingredients as described in the Preferred Activator Salt Compositions. The bromide ion source can also be used in the form of a small tablet which is installed in a special compartment of the preferred dispensing means disclosed hereinbelow.

When formulated into compositions suitable for use in the method herein, the sanitizing agent should be in one composition and the activator should be in a separate composition. These two compositions separately provide hypochlorite and bromide ions to the toilet bowl.

Preferred Activator Salt Compositions

The activator salts can be formulated into compositions for use in the method herein.

Optionally, the activator-salt compositions can contain other ingredients which it is desired to dispense into the toilet bowl, such as, for example, dyes, surfactants, sequestering agents and perfumes, as well as diluents such as water, organic solvents such as ethanol, and organic or inorganic salts such as sodium sulfate, sodium chloride and sodium acetate.

Surfactants can provide enhanced cleaning performance through emulsification of soils, and also provide some sudsing in the toilet bowl, which may be aesthetically desirable. Perfumes provide a pleasant smell to the area surrounding the toilet and also help to mask the "bleach" smell of the sanitizing agent. Sequestrants aid soil removal by sequestration of multivalent metal ions.

When the activator-salt is formulated with surfactants, the resulting compositions will generally comprise from about 0.5% up to about 30% (preferably from about 2% to about 15%) bromide ion and from about 5% to about 95% surfactant. Perfumes will normally be used at levels of up to about 25% and inert diluents at levels up to about 90%. Sequestering agents such as potassium pyrophosphate, sodium tripolyphosphate sodium ethylenediamine tetracetate and diethylenetriamine pentaacetate can be used at levels up to about 25%.

Certain particularly desirable sequestering agents which prevent the formation of stains on toilet bowl surfaces caused by hypochlorite-oxidation of manganese ions which may be present in the water supply are sodium hexametaphosphate and the partially hydrolyzed polyacrylate polymers and ethylene-maleic anhydride polymers Compositions comprising the activator salt and a surfactant and/or other ingredients can be conveniently formed into a cake for use in dispensers which are designed to receive a cake of solid material (see description of dispensing means, below). Such cakes can be made by extrusion or hydraulic stamping, or by pouring a melt of the composition into a mold and solidifying the composition by cooling.

If it is desired to use a dispensing means which is designed to receive liquids, the activator salt and any optional ingredients such as surfactants, etc., can be formulated into liquid compositions.

Surfactants suitable for use in the compositions herein can be of the anionic, nonionic, ampholytic or zwitterionic type, well known in the art.

Bleach-stable (i.e., hypochlorite-stable) surfactants which are especially resistant to oxidation are the alkyl sulfates (AS), alkyl benzene sulfonates (LAS) and paraffin sulfonates. Alkyl sulfates are the water-soluble salts of sulfated fatty alcohols containing from about 8 to about 18 carbon atoms in the alkyl group. Examples of suitable alcohols which can be employed in alkyl sulfate manufacture include decyl, lauryl, myristyl, palmityl and stearyl alcohols and the mixtures of fatty alcohols derived by reducing the glycerides of tallow and coconut oil.

If needed, pH adjusting agents such as sodium carbonate, sodium silicate, oxalic acid, citric acid, etc., can be incorporated into the activator salt composition. Normally, however, such agents are not needed since the flush water will already be within the desired pH range.

A preferred activator salt composition is:

| Component | Wt. % |
|---|---|
| NaLAS | 30.2 |
| NaAS | 30.3 |
| Perfume | 11.0 |
| NaCl | 12.5 |
| NaBr | 14.3 |
| Dye | 1.7 |

The preferred surfactant cakes are made from flakes made according to the procedure set out below.

The process steps for making the preferred surfactant flakes are summarized as:

1. Form a 25° C. to 95° C., preferably 38° C. to 66° C., water-wet paste of the AS, LAS, NaCl and, optionally a buffer to adjust the pH of the paste to 7 to 9.5 for rapid processing stability. The paste should have a moisture content of from about 25% to about 60%. The paste is preferably concentrated to about 50% to about 70% solids to improve the efficiency of the drum dryer.
2. Drying the heated paste on a heated roll drum dryer at a temperature of 120° C. to 190° C., preferably 150° C. to 175° C., to provide hot flakes having a moisture content of from about 0.1% up to about 1.8%, preferably up to about 1.2%, and a thickness of 0.1 to 1.3 mm.
3. Cool the hot flakes in a dry gas environment having a dewpoint of up to 10° C., preferably below 0° to 4° C. The flakes are cooled to about ambient temperature or below.

The dry gas, preferably dry nitrogen or dry air, must have a dewpoint of less than about 10° C. The flakes comprise, in percentages by weight, 90 to 99.5% of a mixture of (1) sodium alkyl sulfate, (2) sodium alkyl benzene sulfonate having a weight ratio of 1:1.5 to 1.5:1, and (3) from 0.5% to 10% of a water-soluble inorganic salt, preferably sodium chloride and/or magnesium chloride. The cooled flakes can have a moisture content of from about 0.1% up to about 1.8%, preferably up to about 1.2%. The stabilized flakes can be used to make surfactant cakes.

The AS/LAS co-surfactant system has a ratio of 1:1.5 to 1.5:1, preferably about a 1:1 mixture of the sodium $C_9$–$C_{15}$ alkyl sulfate (AS) and sodium $C_9$–$C_{15}$ alkyl benzene sulfonate (LAS). The most preferred AS is often called lauryl sulfate and is derived from coconut oil, and the most preferred LAS is often called lauryl benzene sulfonate. AS is needed for its solubility and processing properties. LAS is needed for its perfume absorbing property which is desirable in one of the flakes' primary uses. The AS/LAS surfactants, including impurities, are present in the flakes at a level of from 90% to 99.5%, preferably 92% to 95%. The flakes preferably contain 38% to 52% AS, 33% to 47% LAS, 0.5% to 10% NaCl, and less than 1.2% moisture.

A processing aid, a water-soluble salt, preferably sodium chloride and magnesium chloride are used in an amount of 0.5% to 10% by weight of the flakes, preferably from 6% to 8%.

A buffer is highly desirable to improve flake and cake storage stability. The preferred buffer for the surfactant system is sodium carbonate which is added to the wet paste and is present in the flake at a level of from about 0.2% to about 3% part per part of the AS surfactant. Other buffers can be used. The pH of the buffered surfactant flake is from about 7 to about 9.5, preferably 7.5 to 8.5.

All percentages and ratios herein are "by weight" unless specified otherwise.

The temperature of the paste of Step 1 is raised preferably from about 25° C. up to about 95° C., more preferably to from 38° C. to 66° C. The viscosity of the paste is preferably from 100 to 10,000 centipoises, more preferably adjusted from 1,000 to 5,000 centipoises, when measured by a Brookfield rotating viscometer using a No. 3 spindle at a speed of 30 rpm. Sodium chloride is preferably used to adjust the viscosity of the paste. A broad range of viscosity is acceptable as long as the paste can be handled. For further ease of handling and to increase the processing rate, the paste is preferably concentrated in a pre-dryer, preferably a plate and frame heat exchanger or a wiped film evaporator, to a moisture level of 30% to 50%, more preferably about 40%.

The dry air or nitrogen should have a dewpoint of 10° C. or below. Examples of commercially available equipment used to produce dry air are: (1) Van Air Regenerative Air Dryer, made by the Van Air Systems, Inc., Co., and (2) refrigeration equipment made by King Refrigeration Mfg. Co.

An exhaust system is required to remove excess steam from above and beneath the drum dryer. The rolls on the drum dryer must be hot enough to dry the paste. The preferred roll temperatures are from 140° C. to 190° C., more preferably from 155° C. to 175° C.

Flake thickness is from 0.1 mm to 1.3 mm, preferably from 0.2 mm to 1.0 mm, more preferably from about 0.2 mm to about 0.6 mm. Measurement can be made by any number of devices, for example, a micrometer or a thickness gauge.

Bulk density of the flakes is from 0.08 to 0.24 gm/cc, preferably from 0.11 to 0.16 gm/cc. The term bulk density means that of a mass of flakes when they are poured gently into a volumetric measure.

In a preferred cake made by blending the coflakes, NaBr, NaCl and other inorganic salts can be used, up to about 40%, preferably 20% to 35%. About 26% to about 28% total inorganic salts is optimum for the preferred cake compositions which are set out below.

The manufacture of solid cakes from the flakes is somewhat related to the art of forming bars of toilet soap. The flakes are admixed into a homogeneous mass with other raw materials such as NaBr, perfumes, dyes, etc., are noodled, plodded, extruded, cut or stamped to form uniform bars or cakes. Firm cakes should have a hardness penetrometer value of less than 120, preferably between 40–100, and most preferably about 65 or less.

EXAMPLE

The flakes are amalgamated with perfume, NaBr, additional NaCl, and dye at ambient conditions using the following formula:

| Ingredients | Parts |
|---|---|
| Flakes* | 63.7 |
| NaBr | 14.3 |
| Perfume | 11.0 |
| NaCl (added) | 9.2 |
| Dye | 1.7 |
| | 100.0 |

*The flakes have a composition of NaAS/NaLAS/NaCl of 47.3/47.3/5.4. The total NaCl in the system was about 12.5%.

The composition was mixed well for 7 minutes and plodded and then extruded through a 1.3 cm×4.9 cm orifice into strips. During extrusion the composition had a temperature of about 26° C. The strips were then cut into cakes and allowed to cool to ambient temperature. The cakes had a pH of about 7, as measured in the flush water.

The cakes had an average finished hardness penetrometer value of 91.

Dispensing Means

In order to provide automatic sanitizing of the toilet bowl in accordance with the present invention, it is essential that the hypochlorite sanitizing agent and bromide activator ions, in the form of relatively concentrated solutions, be dispensed into the flush water each time the toilet is flushed.

Although not preferred it is within the contemplation of the present invention that the concentrated solution of one of the components (i.e., either the activator composition or the sanitizing agent composition) be dispensed in to the flush tank during the refill after a flush (thereby forming a dilute solution of one composition in the flush water which is stored in the tank between flushes) and that the concentrated solution of the other composition be dispensed into this treated flush water during the "down-flush," i.e., during the time the flush water is flowing from the tank to the bowl during the next succeeding flush. Dispensing means which operate to dispense solutions into a toilet tank during the time it is refilling are described, for example, in U.S. Pat. Nos. 1,798,090, Lebegue, issued Mar. 24, 1931; 3,339,801, Hronas, issued Sept. 5, 1967; and 3,121,236, Yadro et al., issued Feb. 18, 1964.

It is preferred that both of the concentrated solutions be dispensed into the flush water on the down-flush, i.e., that they be dispensed into the flush water during the time the flush water is flowing from the tank into the bowl. In this preferred mode of operation, it is additionally preferred that the dispensing of the hypochlorite and activator ions should occur near the end of the flush in order to avoid wastage. The respective dispensing means for the hypochlorite and activator solutions should preferably be in positions relative to each other in the toilet tank so that these concentrated solutions will be diluted by flush water during the flush before they come into contact with each other, i.e., intimate mixture of streams of the two concentrated solutions in the flush tank should preferably be avoided.

Dispensing means for automatically dispensing solutions of chemicals into the flush water during the down-flush are known to the art. U.S. Pat. No 3,504,384, Radley et al., issued Apr. 7, 1970, discloses a dual dispenser for separately dispensing a detergent/dye solution and a hypochlorite solution into the flush water during the flush. Water from the flush tank flows into the respective dispenser chambers as the tank fills after a flush, where it comes into contact with a solid detergent/dye composition and a solid hypochlorite-producing composition in the respective chambers. During the interval between flushes, relatively concentrated solutions of the hypochlorite and detergent/dye compositions form in the respective chambers, and these solutions are discharged into the flush water on the next flush. It should be noted that the inlet and outlet ports of the dispenser chambers in the Radley et al. dual dispenser are not closed between flushings, and therefore there is opportunity for ingredients in the respective concentrated solutions in the chambers to diffuse into the tank water between flushes, whereby there is also opportunity for ingredients from one dispenser chamber to ultimately find their way into the solution in the other dispenser chamber. The longer the time interval between flushes, the more likelihood there is that some portion of the contents of the two dispenser chambers will have an opportunity to come into contact with each other before they are dispensed into the flush water on the next flush. While dispensing devices of the type disclosed in Radley et al. can be used in the method of the present invention, they are not preferred.

Dispensers which completely or substantially completely isolate their contents from the tank water during the quiescent period between flushes are known to the art and are the preferred type for use in the present invention. Such dispensers are disclosed, for example, in U.S. Pat. No. 3,831,205, Foley, issued Aug. 27, 1974; U.S. Pat. No. 3,341,074, Panutti, issued Sept. 12, 1967; U.S. Pat. No. 4,036,407, Slone, issued July 19, 1977; U.S. Pat. No. 4,171,546, Dirksing, issued Oct. 23, 1979; U.S. Pat. No. 4,208,747, Dirksing, issued June 24, 1980, Re-examination Certificate issued Aug. 16, 1983; and U.S. Pat. No. 4,307,474, Choy, entitled "Passive Dosing Dispenser Exhibiting Improved Resistance To Clogging", issued Dec. 29, 1981.

Preferred dispensers which are designed to receive solid compositions are those of the type disclosed in U.S. Pat. Nos. 4,171,546 and 4,208,747, supra. These dispensers also isolate the contents of the dispenser from the tank water. Particularly preferred dispensers are disclosed in commonly assigned and co-pending application of Brown and Strickland, entitled "Passive Dosing Dispenser Featuring High Strength Initial Cleaning Action", filed of even date, and incorporated herein by reference, supra. In a preferred embodiment of the Brown and Strickland application three chambers are constructed into a dispenser unit, two chambers containing sanitizing agent compositions and the other containing the activator-salt composition. One of the two sanitizing compositions is designed to deplete in about 15 to about 70 flushes. The other one is designed to last for the life of the product.

Accordingly, the present invention also encompasses an article of manufacture designed for placement below the high water line of the flush tank of a toilet comprising a flush tank and a bowl. The article comprises three dispensing means (i.e., dispensers), the first dispensing means containing a solid composition which is soluble in water and comprises a compound which provides hypochlorite ions in aqueous solution for the life of the article, a second dispensing means contains another solid composition of hypochlorite which is designed to provide extra available chlorine for about 15 to 70 initial flushes. A third dispensing means contains a solid composition which is soluble in water and which contains a water-soluble source of bromide ion. The first, second and third dispensing means each have means for receiving water from the flush tank when the flush tank refills after a flush and for maintaining said received water in contact with the respective solid compositions during the quiescent period between flushes so as to form concentrated solutions of the compositions in the respective dispensing means between flushes. Each dispensing means has a means for releasing said concentrated solutions into the water in the flush tank when the water flows from the tank during flushing. When this article is placed in the flush tank of a toilet it is positioned in a manner such that the means for receiving water and the means for releasing concentrated solutions in the respective dispensing means are below the high water line of the flush tank. The dispensing means function to produce a concentration of available chlorine of from about 20 ppm to about 100 ppm for from about 15 to 70 flushes, and from about 3 up to below 20 ppm available chlorine thereafter, and, a concentration of bromide ion of from about 0.1 ppm to about 20 ppm, and a pH of from about 6 to about 9.5 in the toilet bowl at the end of the flush. As indicated above, it is preferable that the respective dispensing means contain means for isolating the concentrated solutions of the respective compositions from the tank water during the quiescent periods between flushes.

What is claimed is:

1. A method of automatic cleaning of a flush toilet bowl, said method comprising the steps of:

I. initially dispensing from separate dispensing means, into the flush water in said flush toilet bowl; (A) an aqueous solution of a compound which produces hypochlorite ion in said aqueous solution; and (B) an aqueous solution of a compound which produces bromide ion in said aqueous solution thereby to form a solution in the toilet bowl at the end of each flush cycle which contains from about 30 ppm to about 100 ppm available chlorine, and from about 0.1 ppm to about 20 ppm bromide ion, and said toilet bowl solution having hypochlorite chlorite to bromide ion weight ratio of from about 1:1 to about 1000:1 said dispensing means charged with sufficient quantities of said solutions of said (A) and (B) compounds to deliver said ppm for at least about 15 to about 70 flushes;

II. subsequently dispensing said aqueous solution which produces said hypochlorite ion to form a solution in the toilet bowl at the end of each flush cycle from about 3 ppm to up to below about 20 ppm available chlorine for at least 100 flushes, wherein said Step I is designed to provide initial automatic cleaning of organic soils and Step II is designed to provice continuing maintenance cleaning of the toilet bowl.

2. The method of claim 1 wherein the respective solutions of said (A) and (B) are both dispensed into the flush water during the down-flush.

3. The method of claim 2 wherein the respective solutions of said (A) and (B) are substantially isolated from the flush water in the toilet tank during quiescent periods between the flushes of the toilet.

4. The method of claim 3 wherein the concentration of available chlorine in Step I is from about 30 ppm to about 50 ppm and the concentration of bromide ion is from about 0.3 ppm to about 3 ppm.

5. The method of claim 4 wherein said available chlorine in Step II is from 3 ppm to 15 ppm.

6. The method of claim 4 wherein the concentration of bromide ion is from 0.5 ppm to about 2 ppm.

* * * * *